United States Patent [19]

Nomura

[11] Patent Number: 4,475,631
[45] Date of Patent: Oct. 9, 1984

[54] AC ELEVATOR CONTROL SYSTEM

[75] Inventor: Masami Nomura, Nagoya, Japan

[73] Assignee: Mitsubishi Denki Kabushiki Kaisha, Chiyodaku, Japan

[21] Appl. No.: 411,477

[22] Filed: Aug. 25, 1982

[30] Foreign Application Priority Data

Aug. 25, 1981 [JP] Japan .................................. 56-133025

[51] Int. Cl.³ .............................................. B66B 1/30
[52] U.S. Cl. ................... 187/29 R; 318/759; 318/808
[58] Field of Search ....................... 187/29; 307/64, 66; 318/757, 759, 762, 807, 809

[56] References Cited

U.S. PATENT DOCUMENTS

| 3,667,016 | 5/1972 | Dunfield et al. | 318/759 |
| 3,688,171 | 8/1972 | Salihi et al. | 318/759 |
| 4,314,190 | 2/1982 | Walker et al. | 318/808 X |
| 4,353,023 | 10/1982 | Kawada et al. | 318/808 X |
| 4,376,471 | 3/1983 | Uchino et al. | 307/64 X |
| 4,405,886 | 9/1983 | Williamson | 318/757 X |
| 4,417,193 | 11/1983 | Hirata | 318/808 X |

FOREIGN PATENT DOCUMENTS 56-7408 6/1981 Japan.
56-6618 9/1981 Japan.

Primary Examiner—Ulysses Weldon
Assistant Examiner—W. E. Duncanson, Jr.
Attorney, Agent, or Firm—Wenderoth, Lind & Ponack

[57] ABSTRACT

An AC elevator control system which includes an inverter for inverting a DC voltage to an AC power having a variable voltage and a variable frequency under the control of a command voltage signal and a command frequency signal, and an induction motor which is driven with the AC power to operate an elevator car. With the induction motor operated in the regenerative braking mode, a switching device responds to the actual speed of the car exceeding its command speed to decrease the command frequency signal to such a magnitude that the induction motor has a slip equal to a predetermined one through a first gain regulator connected between a command speed generator and a command frequency generator. Simultaneously a second gain regulator is enabled to equal the command voltage signal to a difference between the actual and command speed signal.

9 Claims, 5 Drawing Figures

AC ELEVATOR CONTROL SYSTEM

BACKGROUND OF THE INVENTION

This invention relates to improvements in an AC elevator control system for controlling an elevator car driven by an AC motor.

There have been already known AC elevator control systems for controlling the speed of the induction motor used as an electric motor for driving an elevator car, by supplying to the induction motor an AC power with a variable voltage and a variable frequency inverted from a DC power with a constant DC voltage by a pulse width modulation type inverter. In those AC elevator control systems, mechanical energy is transformed to electrical energy during the descent of the elevator car under heavy loading, the ascent thereof under light loading or the deceleration thereof. That electrical energy is then returned back to the DC side through the inverter. When a DC source used is formed of a battery, the latter is excessively charged so as to evolve a harmful gas or gases. This has resulted in a decrease in the lifetime of the battery. Alternatively, when the DC source is formed of a rectifier and a capacitor connected thereacross, the capacitor has increased in voltage thereacross, resulting in a fear that the component forming the inverter may be dielectrically broken down. Furthermore, if a ratio of a voltage applied across the induction motor to a frequency thereof exceeds a predetermined magnitude, then the induction motor has been saturated in magnetic flux flowing therethrough, resulting in an excessive current flowing through the induction motor.

Thus the AC elevator control systems as described above have necessarily included the equipment for treating the regenerative power returned back to the DC side. For example, with the DC source formed of a rectifier and a capacitor connected thereacross, a separate inverter has been connected across the rectifier and controlled by a return-of-power control device connected across the DC side of the firstmentioned inverter. When a DC voltage across the capacitor exceed a predetermined magnitude upon the occurrence of the regenerative power as described above, the return-of-power control device has been operated to actuate the separate inverter with the result that the DC voltage is returned back to the AC side of the rectifier.

However, the separate inverter and the return-of-power device have been too expensive for an induction motor having an efficiency of operation which does not quite offer a problem because of its relatively small capacity. Also, with a three-phase AC source formed of an emergency three-phase generator, adverse influences might occurs. For example, the generator has an increased three-phase voltage thereacross.

Accordingly, it is an object of the present invention to provide a new and improved AC elevator control system capable of consuming, by the interior of an induction motor, a regenerative power developed thereon during the descent of an associated elevator car under heavy loading, the ascent thereof under light loading or the deceleration thereof resulting in the elimination of the necessity of using equipment for treating the regenerative power.

SUMMARY OF THE INVENTION

The present invention provides an AC elevator control system comprising a DC source, an inverter connected to the DC source to invert a DC power from the DC source to an AC power having a variable voltage and a variable frequency under the control of both a command voltage signal and a command frequency signal, an AC motor driven with the inverted AC power, an elevator car operated by the AC motor, and a circuit for changing the command frequency signal in the regenerative braking mode of operation of the AC motor to decrease a frequency imparted to the AC motor to a magnitude smaller than that upon the initiation of the regenerative braking mode of operation.

In a preferred embodiment of the present invention, the AC elevator control system may comprise, in addition to the DC source, the inverter, the AC motor and the elevator car as described in the preceding paragraph, a speed sensor connected to the AC motor to generate an actual speed signal indicating an actual speed of the elevator car, a command speed generator for generating a command speed signal, an adder supplied with the command speed signal and the actual speed signal to produce a difference signal therebetween, a command frequency generator for generating a command frequency signal dependent upon the command speed signal, a command voltage generator for generating a command voltage signal substantially proportional to the command frequency signal, an inverter control means responsive to both the command frequency signal and the command voltage signal to control a frequency and a pulse width with which the AC motor is driven, a first gain regulator connected between the command frequency generator and the command speed generator to produce a predetermined output signal in accordance with the command speed signal, a second gain regulator connected between the adder and the command voltage generator to produce an output signal in response to the difference signal from the adder, and a switching means connected to the adder to be responsive to the polarity of the difference signal therefrom to switch connections so that the output signals from the first and second gain regulators are supplied to the command frequency generator and the command voltage regulator respectively, the arrangement being so that, in the regenerative braking mode of operation of the AC motor in which the descent of the elevator car under heavy loading, the ascent thereof under light loading and the deceleration thereof are selectively effected, the command frequency signal is changed to decrease a frequency imparted to the AC motor to a magnitude smaller than that upon the initiation of the braking mode of operation of the AC motor.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
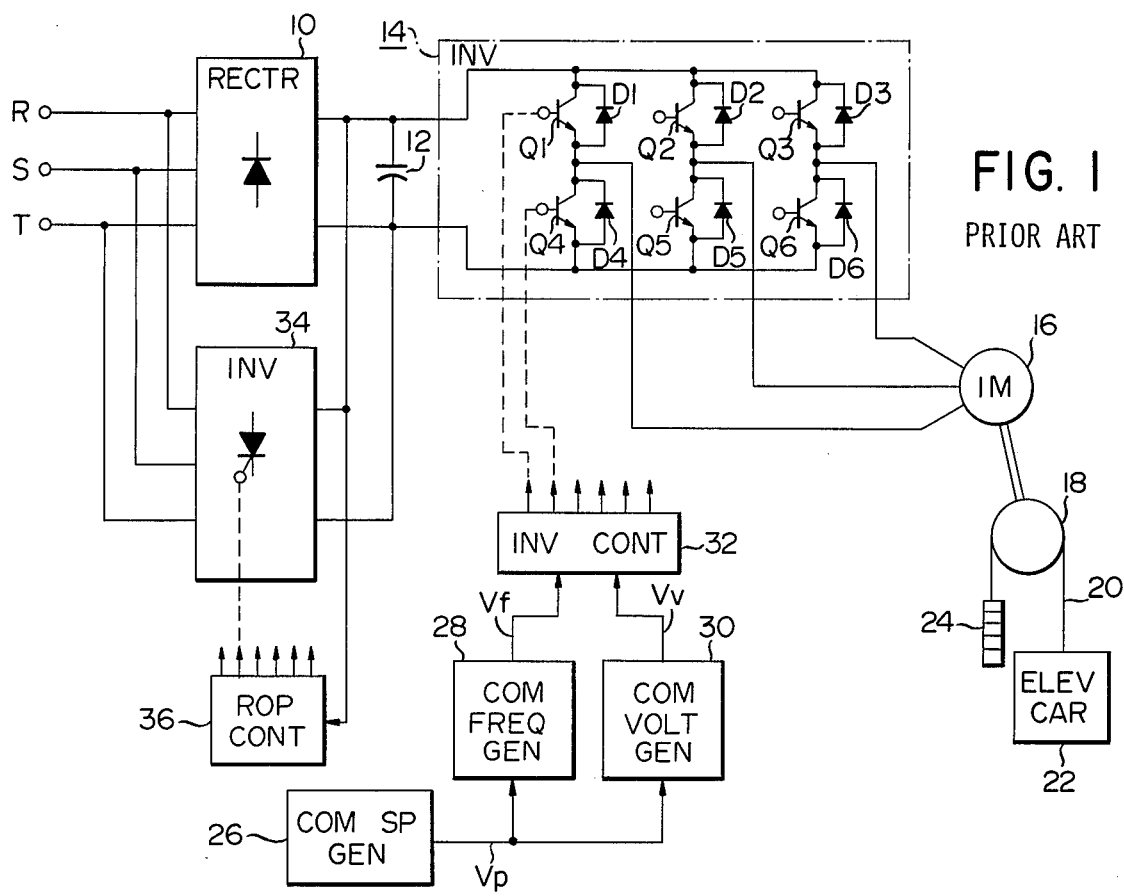
FIG. 1 is a combined circuit and block diagram of a conventional AC elevator control system.

Referring now to FIG. 1 of the drawings, there is illustrated a conventional AC elevator control system. The illustrated arrangement comprises a rectifier 10 connected to a three-phase electric source labelled, R, S and T to rectify a three-phase voltage from the electric source into a predetermined constant direct current, a smoothing capacitor 12 connected across the DC output of the rectifier 10 and an inverter generally designated by the reference numeral 14 and connected across the capacitor 12.

The inverter 14 is of a pulse-width modulation type well known in the art and includes three pairs of serially connected NPN transistors $Q_1$ and $Q_4$, $Q_2$ and $Q_6$ and $Q_3$ and $Q_6$ connected in a parallel circuit relationship to one another and also across the capacitor 12. More specifically, the transistors $Q_1$, $Q_2$ and $Q_3$ include respective collector electrodes connected to one side of the capacitor 12 and respective emitter electrodes connected to the collector electrodes of the mating transistors $Q_4$, $Q_5$ and $Q_6$ respectively and also semiconductor diodes $D_1$, $D_2$ and $D_3$ connected across the collector and emitter electrodes thereof respectively and so arranged that a current flows from the emitter to the collector electrode of the mating transistor. Each of the transistors $Q_4$, $Q_5$ and $Q_6$ includes an emitter electrode connected to the other side of the capacitor 12 and a semiconductor diode $D_4$, $D_5$ or $D_6$ connected across the collector and emitter electrodes thereof in the same manner as the diode $D_1$, $D_2$ or $D_3$.

All the transistors include base electrodes connected to an inverter control device as will be described later.

The inverter 14 is operative to invert a constant direct voltage across the capacitor 12 to an alternating current having a variable voltage and a variable frequency.

Then a three-phase induction motor 16 is connected to the junction of the emitter electrode of one of the pairs of serially connected transistors and the collector electrode of the other thereof for each phase to be driven by the inverter 14. The three-phase inductor motor 16 is mechanically connected to a sheave 18 of a hoist to drive the latter. Subsequently, a length of a traction rope 20 is trained over the sheave 18 and connected at both ends to an elevator car 22 and a balance weight 24.

The arrangement further comprises a command speed generator 26 for generating a command speed signal $V_p$, connected to a command frequency generator 28 and a command voltage generator 30. The generators 28 and 30 are operative to generate a command frequency signal $V_f$ dependent upon the command speed signal $V_p$ and a command voltage signal $V_v$ substantially proportional to the command frequency signal $V_p$ respectively. The generators 28 and 30 are connected to an inverter control device 32 which is, in turn, connected to the base electrodes of all the transistors as described above. The inverter control device 32 is responsive to the command frequency and voltage signals $V_f$ and $V_v$ respectively from the generators 28 and 30 to control a frequency and a pulse width of the inverter 14 so as to thereby control an output voltage therefrom.

Furthermore, a separate inverter 34 is connected across the rectifier 10 and also on the DC side to return-of-power control device 36 and also across the smoothing capacitor 12.

In operation, the inverter 14 is controlled by the control device 34 to supply an AC current at both a variable voltage and a variable frequency to the induction motor 16 which, in turn, drives the elevator car 22 through the sheave 18 and the length of traction rope 20. This results in the control of a traveling speed of the elevator car 22.

It is now assumed that the elevator car 22 is descending while it is loaded with passengers corresponding to its loadage which is equal to a maximum load capable of being carried by the elevator car upon its actual use. Under the assumed conditions, the induction motor 16 acts as an induction generator to permit an electric power to flow into the DC side of the inverter 14 through the diodes $D_1$ through $D_6$ resulting in the charge of the capacitor 12 and therefore, in an increase in voltage thereacross. When the voltage across the capacitor reaches a predetermined magnitude, the return-of-power control circuit 36 is operated to actuate the inverter 34 to return the DC power back to the AC side of the rectifier 10.

However, where the induction motor 16 has a relatively small capacity so that the same is of an operation efficiency which does not quite offer a problem, the inverter 34 and the return-of-power control device 36 have been excessively expensive. Also, the AC source R, S, T formed of an emergency three-phase generator might cause adverse influences such as an increase in voltage thereacross and others.

The present invention contemplates the elimination of the objections to the prior art practice as described above by the provision of means for decreasing a frequency imparted to a three-phase traction motor during the descent of an elevator car under heavy loading, the ascent thereof under light loading or the deceleration of the elevator car so as to thereby eliminate the necessity of using equipment for treating a regenerative electric power.

Figure 2:
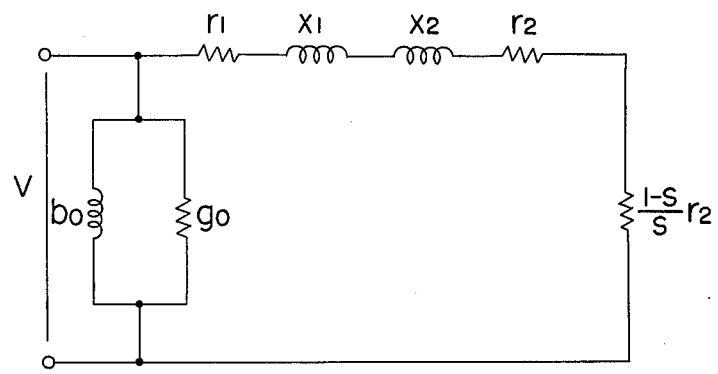
FIG. 2 is a diagram of an L type equivalent circuit to a three-phase induction motor useful in explaining the principles of the present invention.

First the principles of the present invention will be described in conjunction with FIG. 2 wherein there is illustrated an L type equivalent circuit to an induction motor. The illustrated arrangement comprises a parallel combination of an excitation susceptance $b_o$ and an excitation conductance $g_o$ of an induction motor which is connected across a series combination of a primary resistance $r_1$, a primary reactance $x_1$, a secondary resistance $r_2$, and secondary reactance $x_2$ of the induction motor and a resistance $(1-s)r_2/s$ due to a slip s of the induction motor. Noticing only the effective power developed in the regenerative braking mode of operation of the induction motor, mechanical energy is entirely consumed by the interior of the induction motor and the effective electric power is not supplied from the DC side provided that the slip s is controlled so that an electric power P1 consumed by the interior of motor may be expressed by $$P1 = V^2 g_o + r_1(V/Z)^2 + r_2(V/Z)^2 \tag{1}$$

where V designates a voltage across the induction motor as shown in FIG. 2 and $$Z = \sqrt{(X_1 + X_2)^2 + (r_1 + r_2/S)^2} \tag{2}$$

and that an electric power $P_g$ generated as a regenerative power may be expressed by $$P_g = (V/Z)^2 \left( \frac{1-s}{s} \right) r_2 \qquad (3)$$

where $$P_1 + P_g = 0 \qquad (4)$$

holds. By substituting the expressions (1) and (3) into the expression (4) and rearranging it, $$s = -\frac{r_2}{r_1 + b_o Z^2} \qquad (5)$$

results where $Z=Z(s)$.

From the expression (5) it is seen that the slip s defined by the expression (5) permits all the regenerative power to be consumed by the interior of the induction motor, resulting in the generation of a braking force regardless of the voltage across the induction motor and without the effective power externally supplied to the motor. Accordingly, it is not necessary to supply to the induction motor an electric power required for the DC excitation thereof as in the DC braking. Also, a quantity of heat generated in the induction motor is not large as compared with the DC braking. Furthermore, a braking torque $T_b$ may be expressed by $$T_b = (V/Z)^2 \left( \frac{1-s}{s} \right) r_2 \cdot \frac{1}{n} \qquad (6)$$

wherein n designates the number of rotation in unit time of the induction motor as will readily be understood from the expression (3). Thus, it is seen that the braking torque can be controlled by controlling the voltage across the induction motor.

Figure 3:
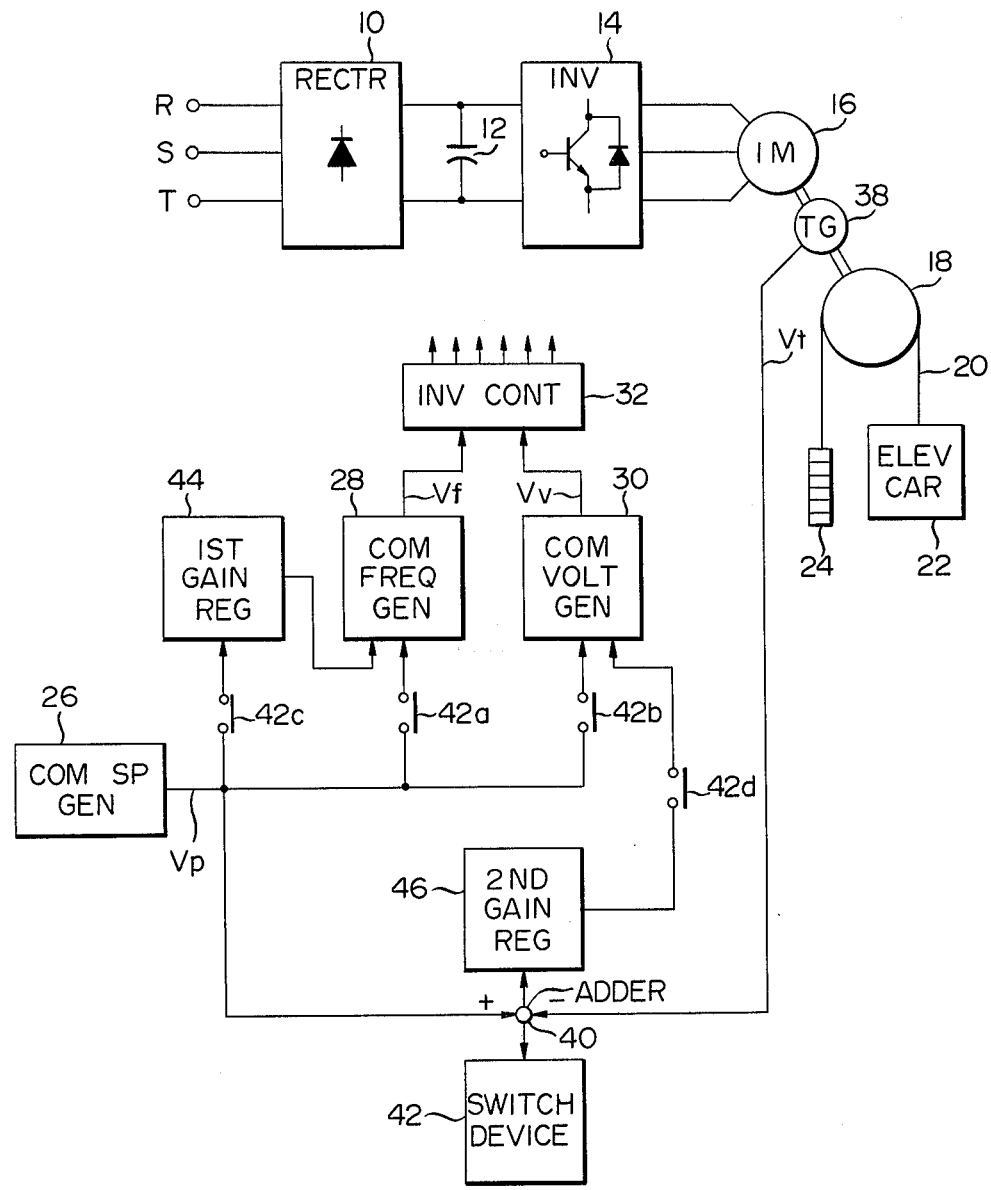
FIG. 3 is a block diagram of one embodiment according to the AC elevator control system of the present invention.

Referring now to FIG. 3, there is illustrated one embodiment according to the AC elevator control system of the present invention which utilizes the principles thereof described above in conjunction with FIG. 2. In the illustrated arrangement, a speed sensor 38 such as a tachometer generator is mechanically connected to the induction motor 16 to generate a signal for the actual speed 14 of the elevator car 22 and is electrically connected to an adder 40 to which the command speed generator 26 is also connected. The adder 40 is connected at one input to a switching device 42 including two sets of normally closed contacts 42a and 42b and two sets of normally open contacts 42c and 42d. As shown in FIG. 3, the adder 40 is supplied with both the actual speed signal $V_t$ with a negative polarity from the speed sensor 38 and the command speed signal $V_p$ with a positive polarity from the command speed generator 26 so as to generate a difference signal therebetween. The switching device 42 is responsive to the polarity of the difference signal from the adder 42 to switch the sets of contacts from one to the other of the closed and open positions.

The command speed generator 26 is further connected via the set of normally open contacts 42c to a first gain regulator 44 which is subsequently connected to the command frequency generator 28 and also connected to the command frequency generator 28 and the command voltage generator 30 through the sets of normally closed contacts 42a and 42b respectively. The first gain regulator 44 is operative to generate an output signal in response to an input signal applied thereto from the command speed generator 26.

The adder 40 includes the other output connected to a second gain regulator 46 which is, in turn, connected to the command voltage generator 30 through the set of normally open contacts 42d. The second gain regulator 46 is operative to generate an output signal in response to an input signal applied thereto from the adder 40.

In other respects the arrangement of FIG. 3 is identical to that shown in FIG. 1 and therefore like reference numerals have been employed to identify the components identical to those shown in FIG. 1.

Figure 4:
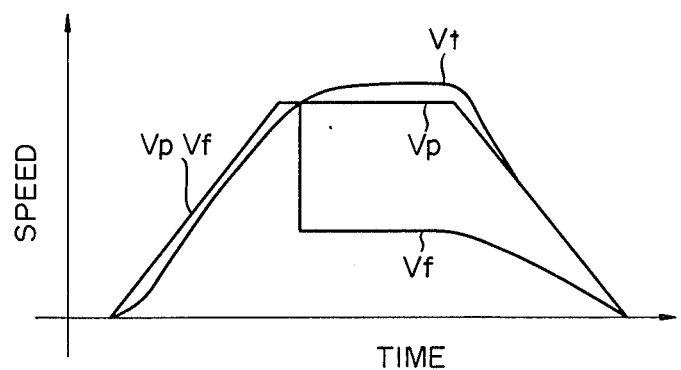
FIG. 4 is a graph illustrating waveforms of signals developed at various points in the arrangement shown in FIG. 3.

The operation of the arrangement shown in FIG. 3 will now be described in conjunction with FIG. 4 wherein there are illustrated waveforms of the signals developed at various points therein.

In a region in which the command speed signal $V_p$ for the elevator car 22 is higher than the actual signal $V_t$ thereof, the adder 40 produces the difference signal with the positive polarity between the positive command speed signal $+V_p$ from the command speed generator 26 and the negative actual signal $-V_t$ from the speed sensor 38. The switching circuit 42 responds to the positive polarity of the difference signal from the adder 40 to maintain the sets of normally closed contacts 42a and 42b in their closed position and the sets of normally open contacts 42c and 42d in their open position.

Thus, the arrangement of FIG. 3 is the same as that shown in FIG. 1. Under these circumstances, the induction motor 16 is operated in such a manner that the voltage and frequency thereof are changed to be substantially proportional to each other following the command speed signal $V_p$. That is, the induction motor 16 is operated according to the so-called constant voltage-to-frequency ratio control. At that time, it is assumed that the elevator car 22 is descending under heavy loading. Under the assumed conditions, the actual speed signal $V_t$ becomes higher than the command speed signal $V_p$ upon the completion of the particular acceleration of the elevator car and the operation is entered into the regenerative mode.

When the switching circuit 42 senses that the actual speed signal is equal to or higher than the command speed signal $V_p$, the sets of the now closed contacts 42a and 42b are open while the sets of now open contacts 42c and 42d are closed. This closure of the contacts 42c causes the gain regulator 46 to be operated to regulate the input to the command frequency generator 28 so as to decrease the command frequency signal $V_f$ to a magnitude thereof at which the slip of the induction motor 16 fulfills the expression (5).

On the other hand, the closure of the contacts 42d causes the output from the gain regulator 44 to be supplied to the command voltage generator 30. Thus, the command voltage signal $V_v$ has a magnitude proportional to the difference signal between the command speed signal $V_p$ and the actual speed signal $V_t$. The command voltage signal $V_v$ with such a magnitude is supplied to the inverter 14 to control an output voltage therefrom. Also the braking torque $T_p$ expressed by the expression (6) is controlled so that the elevator car 22 is operated in accordance with the command speed signal $V_p$.

Even if the absolute value of the slip tends to be higher than a value as defined by the expression (5), then the supply power is only increased correspondingly which attains the object of the present invention that no power is regenerated on the DC side in the regenerative braking mode of operation.

Figure 5:
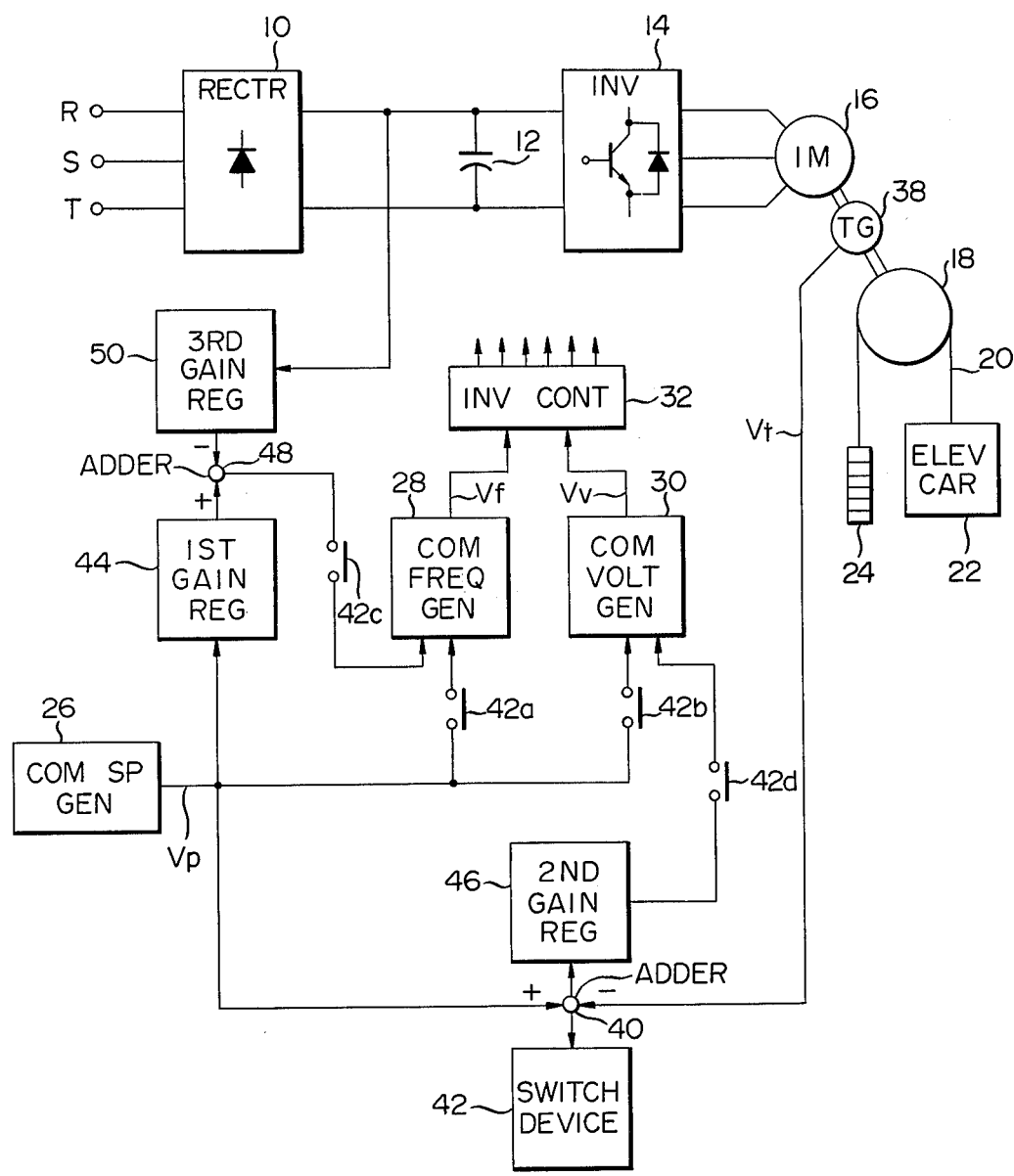
FIG. 5 is a diagram similar to FIG. 3 but illustrating a modification of the present invention.

In FIG. 5, wherein like reference numerals designate the components identical to those shown in FIG. 3, there is illustrated a modification of the present invention. The illustrated arrangement is different from that shown in FIG. 3 only in that in FIG. 5, the gain regulator 44 is directly connected at the input to the command speed generator 26 and connected at the output to the command frequency generator 28 through a series combination of an adder 48 and the set of normally closed contacts 42c. The positive output of the rectifier 10 is connected to a gain regulator 50 which is subsequently connected to the adder 48.

As shown in FIG. 5, the adder 48 has an output supplied thereto with both a negative polarity from the gain regulator 50 and an output with a positive polarity from the gain regulator 44 to produce a difference signal therebetween which is, in turn, supplied to the command frequency generator 28 through the set of contacts 42c put in its closed position.

The arrangement of FIG. 5 is intended to return, as a signal, a flow of an electric power through the DC side of the rectifier 10 back to the command frequency generator 28 in the braking mode of operation so as to thereby control the frequency of the generator 28. More specifically, during a flow of an electric power from the rectifier 10 through the inverter 14, the induction motor 16 supplies to the inverter 14 a regenerative power increased so as to render the frequency of the inverter 14 higher while upon an increase in voltage across the induction motor, the latter supplies to the inverter a regenerative power decreased so as to render the frequency of the inverter lower. This measure permits regenerative energy to compensate for a loss of the inverter 14 resulting in the operation of the induction motor 16 with a high efficiency as compared with the arrangement shown in FIG. 3.

In other words, when the induction motor 16 is operated at such a frequency that the slip thereof fulfills the expression (5), regenerative energy can only compensate for a loss due to both winding resistances and an excitation. However, by feeding the electric power back to the DC side to maintain the flow of the electric power through the DC side always equal to zero, the resulting regenerative power can compensate for not only the loss due to both the winding resistances and the excitation but also for a loss of the inverter 14.

Such an operation is not desirable for the induction motor 16 high in capacity because the resulting efficiency of operation becomes low as compared with he arrangement shown in FIG. 1. However, if that operation is performed only when an emergency generator is employed during a power failure of the electric source R, S, T. Then, the emergency generator can be smaller sized. Alternatively, with a battery used as a DC source, it is possible to prevent the battery from reducing its lifetime due to the rapid charge thereof.

From the foregoing it is seen that the present invention provides an AC elevator control system comprising an inverter for inverting a DC power to an AC power having a variable voltage and a variable frequency, an induction motor energized with the AC power, and an elevator car driven by the induction motor wherein a command frequency signal is changed in the regenerative braking mode of operation for example, during the descent of the elevator car under heaving loading, during the ascent thereof under light loading or during the deceleration thereof to decrease a frequency imparted to the induction motor to a magnitude lower than that upon the initiation of the braking thereof. Therefore, upon the regenerative braking of the induction motor, a slip thereof can be controlled so as to render a regenerative power applied the the DC side equal to zero. This permits the elimination of the necessity of using equipment for treating the regenerative power.

Also with an electric power for driving the electric car supplied by an emergency electric source such as an emergency AC generator or a battery, the present invention can render the emergency electric source small-sized, alternatively, the battery can increase its lifetime because the same is prevented from rapidly charging.

While the present invention has been illustrated and described in conjunction with a few preferred embodiments thereof, it is to be understood that numerous changes and modifications may be resorted to without departing from the spirit and scope of the present invention. For example, while the present invention has been described in conjunction with the determination of the frequency of the induction motor so as to cause the slip thereof to fulfill the expression (5) on the basis of the command speed signal for purposes of simplification, it is to be understood that the same is equally applicable to such determination of the frequency of the induction motor on the basis of the actual speed signal. Also, it will readily be understood that the induction motor in the power running mode of operation may be subjected to any one of the well known controls such as the slip frequency control, the vector control, etc. other than the constant voltage-to-frequency ratio control as described above.

What is claimed is:

1. An AC elevator control system comprising: a DC source, an inverter connected to said DC source for inverting a DC power from said DC source to an AC power having a variable voltage and a variable frequency under the control of both a command voltage signal and a command frequency signal, an AC motor driven by said inverted AC power, an elevator car operated by said AC motor, and a circuit for changing said command frequency signal during a regenerative braking mode of operation of said AC motor so as to decrease a frequency of said AC power imparted to said AC motor to a magnitude which is smaller than that upon the initiation of said regenerative braking mode of operation, wherein said circuit generates said command frequency signal for causing an AC motor slip such that an electric power consumed as losses within said AC motor are made equal to an electric power generated by said AC motor as a regenerated electric power.

2. An AC elevator control system as claimed in claim 1, wherein said circuit comprises: a speed sensor connected to said AC motor for generating a speed signal $V_t$ indicating an actual speed of said elevator car, a command speed generator for generating a command speed signal $V_p$, a comparator supplied with said command speed signal $V_p$ and said speed signal $V_t$ for generating a difference signal therebetween, a command frequency generator for generating a command frequency signal $V_f$ in accordance with said command speed signal $V_p$, a command voltage generator for generating a command voltage signal $V_v$ substantially proportional to said command frequency signal $V_f$, and an inverter control which is responsive to said command frequency signal $V_f$ and said command voltage signal $V_v$ for controlling a frequency and a pulsewidth of said AC power driving said AC motor; wherein said difference signal from said comparator respectively changes said command frequency signal $V_f$ from said command frequency generator and said command voltage signal $V_v$ from said command voltage generator so as to thereby cause said regenerated electric power generated by said AC motor in said regenerative braking mode of operation to be consumed by losses within said AC motor.

3. An AC elevator control system as claimed in claim 1, wherein a selected one of the descent of said elevator car under heavy loading and the ascent thereof under light loading is effected in said regenerative braking mode of operation of said AC motor.

4. An AC elevator control system comprising: a DC source, an inverter connected to said DC source to invert a DC power from said DC source to an AC power having a variable voltage and a variable frequency under the control of both a command voltage signal and a command frequency signal, an AC motor driven by said inverted AC power, an elevator car operated by said AC motor, a speed sensor connected to said AC motor to generate an actual speed signal indicating an actual speed of said elevator car, a command speed generator for generating a command speed signal, an adder supplied with said command speed signal and said actual speed signal so as to produce a difference signal therebetween, a command frequency generator for generating a command frequency signal dependent upon said command speed signal, a command voltage generator for generating a command voltage signal substantially proportional to said command frequency signal, an inverter control means which is responsive to both said command frequency and said command voltage signal for controlling a frequency and a pulsewidth of said AC power which drives said AC motor, a first gain regulator connected between said command frequency generator and said command speed generator so as to produce a predetermined output signal in accordance with said command speed signal, a second gain regulator connected between said adder and said command voltage generator so as to produce an output signal in response to said difference signal from said adder, and a switching means connected to said adder so as to be responsive to the polarity of said difference signal therefrom for switching connections so that said output signals from said first and second gain regulators are supplied to said command frequency generator and said command voltage regulator respectively, the arrangement being such that in said regenerative braking mode of operation of said AC motor in which the descent of said elevator car under heavy loading, the ascent thereof under light loading and the deceleration thereof are selectively effected, said command frequency signal is changed so as to decrease a frequency of said AC power imparted to said AC motor to a magnitude which is smaller than that upon the initiation of said regenerative braking mode of operation of said AC motor.

5. An AC elevator control system as claimed in claim 4 wherein a selected one of the descent of said elevator car under heavy loading and the ascent thereof under light loading is effected in said regenerative braking mode of operation of said AC motor.

6. An AC elevator control system as claimed in claim 4, further comprising another adder and a third gain regulator, said third gain regulator being connected to said DC source for providing an output signal in response thereto and said another adder being operatively connected both between said first gain regulator and said command frequency generator and to said third gain regulator such that said another adder provides a signal to said command frequency converter which is equal to said output signal from said first gain regulator minus said output signal from said third gain regulator.

7. An AC elevator control system comprising: an AC power source, a rectifier for rectifying AC power from said AC power source into DC power, an inverter connected to said rectifier to invert a DC power from said rectifier to an AC power having a variable voltage and a variable frequency under the control of both a command voltage signal and a command frequency signal, an AC motor driven by said inverted AC power, an elevator car operated by said AC motor, an emergency electric power source which is enabled so as to supply said AC power to said rectifier during a power failure of said AC power source, a speed sensor connected to said AC motor to generate an actual speed signal indicating an actual speed of said elevator car, a command speed generator for generating a command speed signal, an adder supplied with said command speed signal and said actual speed signal so as to produce a difference signal therebetween, a command frequency generator for generating a command frequency signal dependent upon said command speed signal, a command voltage generator for generating a command voltage signal substantially proportional to said command frequency signal, an inverter control means which is responsive to both said command voltage signal for controlling a frequency and a pulsewidth of said AC power which drives said AC motor, a first gain regulator connected between said command frequency generator and said command speed generator to produce a predetermined output signal in accordance with said command speed signal, a second gain regulator connected between said adder and said command voltage generator so as to produce an output signal in response to said difference signal from said adder, and a switching means connected to said adder so as to be responsive to the polarity of said difference signal therefrom for switching connections so that said output signals from said first and second gain regulators are supplied to said command frequency generator and said command voltage regulator respectively, the arrangement being such that in said regenerative braking mode of operation of said AC motor in which the descent of said elevator car under heavy loading, the ascent thereof under light loading and the deceleration thereof are selectively effected, said command frequency signal is changed so as to decrease a frequency of said AC power imparted to said AC motor during said power failure to a magnitude which is smaller than that upon the initiation of said regenerative braking mode of operation of said AC motor.

8. An AC elevator control system as claimed in claim 7 wherein said emergency electric power source comprises an emergency AC generator.

9. An AC elevator control system as claimed in claim 7 wherein said emergency electric power source comprises a battery for supplying a DC power to said inverter.

* * * * *